United States Patent [19]

Raymond

[11] Patent Number: 4,779,888

[45] Date of Patent: Oct. 25, 1988

[54] BOAT TRAILER LIFT

[75] Inventor: James W. Raymond, Duluth, Minn.

[73] Assignee: Liftmate, Inc., Duluth, Minn.

[21] Appl. No.: 32,487

[22] Filed: Mar. 30, 1987

[51] Int. Cl.[4] ............................................... B60P 3/10
[52] U.S. Cl. .............................. 280/414.1; 280/414.5; 280/475; 280/764.1; 280/766.1
[58] Field of Search ............... 280/414.1, 414.3, 414.5, 280/475, 764.1, 766.1; 414/495, 496, 500; 114/344; 254/418

[56] References Cited

U.S. PATENT DOCUMENTS

| 3,169,644 | 2/1964 | Godbersen | 214/1 |
| 3,295,864 | 1/1967 | Norrby | 280/414.1 |
| 3,692,329 | 9/1972 | Conner | 280/766.1 |
| 4,318,632 | 3/1982 | Fortmeyer | 280/414 |
| 4,505,619 | 3/1985 | Sargent | 280/414.1 |
| 4,536,009 | 8/1985 | Ashworth | 280/764.1 |

Primary Examiner—John J. Love
Assistant Examiner—Richard Camby
Attorney, Agent, or Firm—Kinney & Lange

[57] ABSTRACT

An attachment for a boat trailer to enable a boat carried by the trailer to be raised and stored above the water, the attachment being readily applied to a conventional trailer by the use of relatively simple tools and comprising a pair of extensible legs which are moved from a normal retracted position to an extended position to raise the trailer sufficiently with respect to the water that the boat is supported above the surface of the water.

The extensible legs may either be legs which are rocked or legs which are formed of two telescoping parts so that one part of each leg can be moved with respect to the other part to effectively extend the leg.

9 Claims, 5 Drawing Sheets

BOAT TRAILER LIFT

BACKGROUND OF THE INVENTION

1. Field of the Invention.

The present invention relates to an attachment for a boat trailer to enable the boat carried thereby to be raised and stored above the water.

2. Description of the Prior Art.

When a boat is not being used for long periods of time, it is very desirable that the boat be stored above the water line to prevent damage to the boat due to waves, for example. Various complicated arrangements have been made for storing a boat above the water. Typical of such arrangements are those shown in the Godbersen U.S. Pat. No. 3,169,644, and the Fortmeyer U.S. Pat. No. 4,318,632. The prior arrangements of these patents involve the use of two frame members one of which supports the boat and the other of which is supported on the lake bottom, the frame members being relatively movable to lift the boat out of the water. The prior types of arrangements involve trailers which are specially designed to provide for the desired lifting action. These trailers are often very expensive.

SUMMARY OF THE INVENTION

The present invention is concerned with an attachment which can be secured to a conventional trailer without any modification of the trailer and which is effective in a relatively simple manner to raise a boat to a point where it is above the water line. The boat is maintained in a stable condition in which it is relatively unaffected by waves and the like.

This is accomplished by providing an arrangement involving extensible legs with a crossbar secured to the legs and maintaining the legs in a spaced apart relationship so that the legs are disposed on opposite sides of the trailer, the crossbar being detachably secured to the frame of the boat trailer. Means are provided for moving the legs from a normal retracted position to an extended position.

Specifically, the means for moving the legs consists of a retracting mechanism detachably secured to the front of the boat trailer with a flexible tension member extending between the retracting mechanism and the legs to extend the legs to a position in which the boat is above the surface of the water. Means are provided for maintaining the tension member in the position in which the legs are extended.

The legs may be extended either by swinging the legs from a retracted position to an extended position in which the boat is out of the water, or by providing legs with two portions that are telescopingly secured together, the legs being extended by relative movement of the telescoping portions.

The retracting mechanism may be in the form of a winch comprising a drum on which is mounted a cable which extends to the extensible legs. The winch may be attached to the tongue of the trailer.

Where the legs are of the type which have two telescoping members, the flexible tension member may be secured to the inner slidable portion to move this portion with respect to the outer portion.

Various other features and advantages of the present arrangement will be apparent from a consideration of the accompanying specification, claims and drawing.

DETAILED DESCRIPTION OF THE PREFERRED EMBODIMENTS

Figure 1:
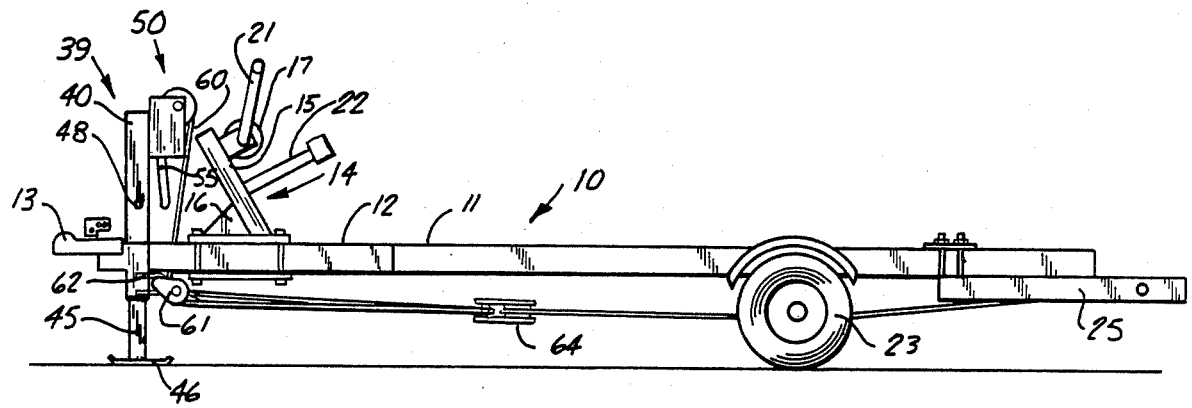
FIG. 1 is a front elevational view of a boat trailer lift with the extensible legs in their retracted position.
Figure 3:
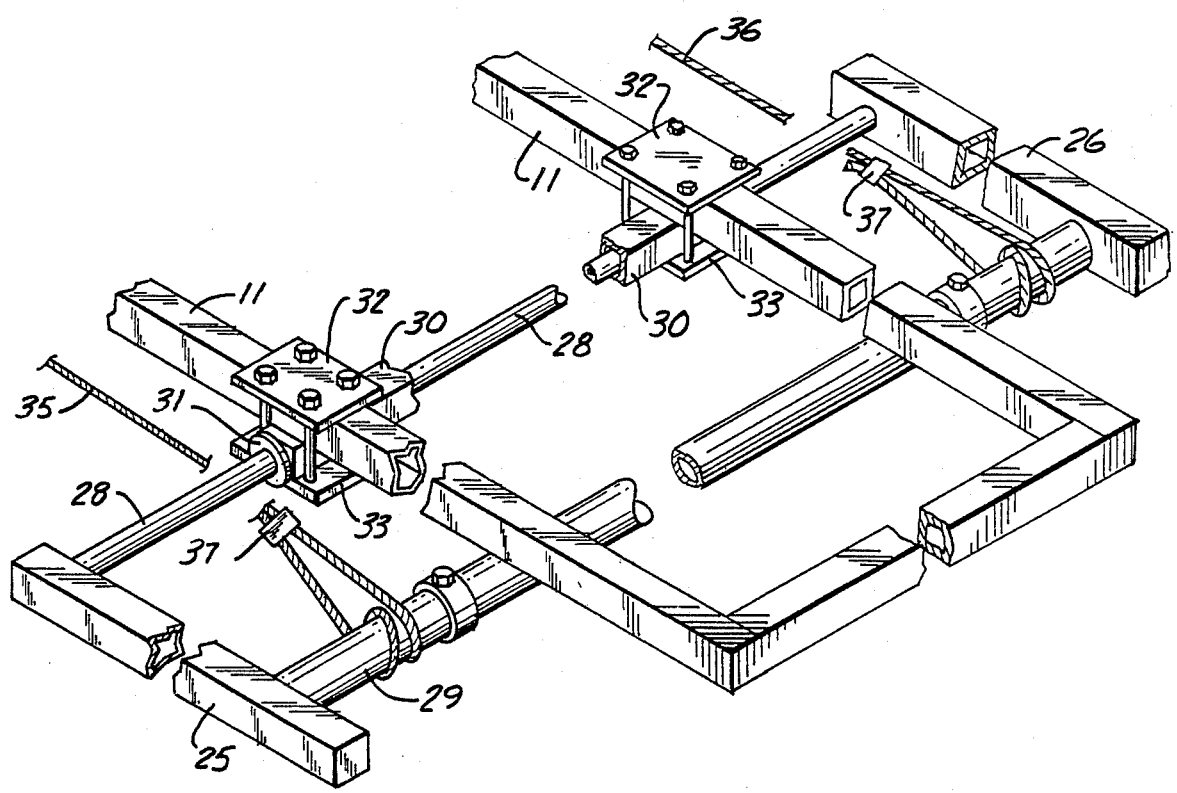
FIG. 3 is a fragmentary view showing the extensible legs and the manner in which they are secured to the frame of the trailer.

Referring to FIG. 1, the trailer, which may be a conventional boat trailer, is indicated by the reference numeral 10. It has two side rails 11, portions of which are shown in FIG. 3. These side rails converge and are secured to a tongue 12. At the forward end of the tongue, there is a conventional coupler hitch 13. This may, for example, permit coupling to a ball mounted on the rear of an automotive vehicle which pulls the trailer 10.

The trailer is provided with a conventional winch assembly 14 for pulling a boat onto the trailer. This winch assembly comprises an inclined winch mounting bar 15 which is held in position by a triangular reinforcing plate 16. Secured to the winch mounting bar 15 is a conventional type of rotatable ratchet drum 17. The winch 14, which is of conventional construction, is for the purpose of pulling a boat onto the trailer. This winch has a cable or similar flexible tension member 19, shown in FIG. 2, which is attachably secured in any suitable manner to the bow of the boat 20 shown in dotted lines. Ratchet drum 17 is rotated by a handle 21 to wind up the cable 19 and pull the boat 20 forwardly and onto the trailer. A bumper arm 22 extends rearwardly and limits the forward movement of the boat.

The winch construction 14 may be fastened in any suitable manner to the tongue 12, as by spaced plates and bolts. The trailer 10 is normally supported at its rear by wheels 23, only one of which is shown in the drawing in connection with the modification of FIGS. 1 through 5. Normally these wheels rest upon the road or other surface over which the trailer is being moved.

The apparatus as described so far is relatively conventional and is typical of boat trailers. The advantage of my arrangement is that it can be readily fastened to such a conventional trailer.

Referring now to the trailer lifting attachment of the present invention, a pair of tubular legs 25 and 26 are secured to the trailer in a manner presently to be described. These legs are extensible either by being rocked or by being formed of two telescoping parts. In the arrangement of FIGS. 1 through 5, the legs are rocked. It will be noticed that in FIG. 1, the leg 25 is in a raised position whereas, in FIG. 2, the leg is shown in a substantially vertical position.

Referring now to FIG. 3, the two legs 25 and 26 (only leg 25 is visible in FIGS. 1 and 2) are tubular and of square cross section. They are both secured to the opposite ends of a rod 28 of circular cross section. They are also secured to a tubular member 29 to form a rectangular frame, the legs 25 and 26 being held in spaced relationship and parallel to each other. The rod 28 and the tube 29 hold the legs spaced apart a distance somewhat greater than the width of the trailer so that the legs 25 and 26 can be pivotally swung about the trailer frame without engaging any members of the trailer. The rod 28 is journaled in a tube 30 of square cross section which has bushings 31 in the opposite ends of the tubular member 30. The tubular member 30 is in turn held in engagement with the trailer frame members 11 at each end of the tubular member by two plates 32 and 33 which are clamped about the adjacent frame member 11 and the tubular member 30 to hold it rigidly in place. The bearings 31 (only one of which is shown in FIG. 3) are forced into the end of the tube 30 and act as bearings to facilitate turning of the rod 28. The tubular legs 25 and 26, the rod 28 and the tube 29 are all held together in a desired relationship by the use of set screws. It is thus possible to have these members disassembled for shipping purposes, while at the same time allowing the members to be readily assembled with simple tools. The legs 25 and 26 are shown in FIG. 3 in their retracted position corresponding to the position they assume in FIG. 1. In this position, the tube 29 may engage the underside of the trailer beam 11.

Figure 2:
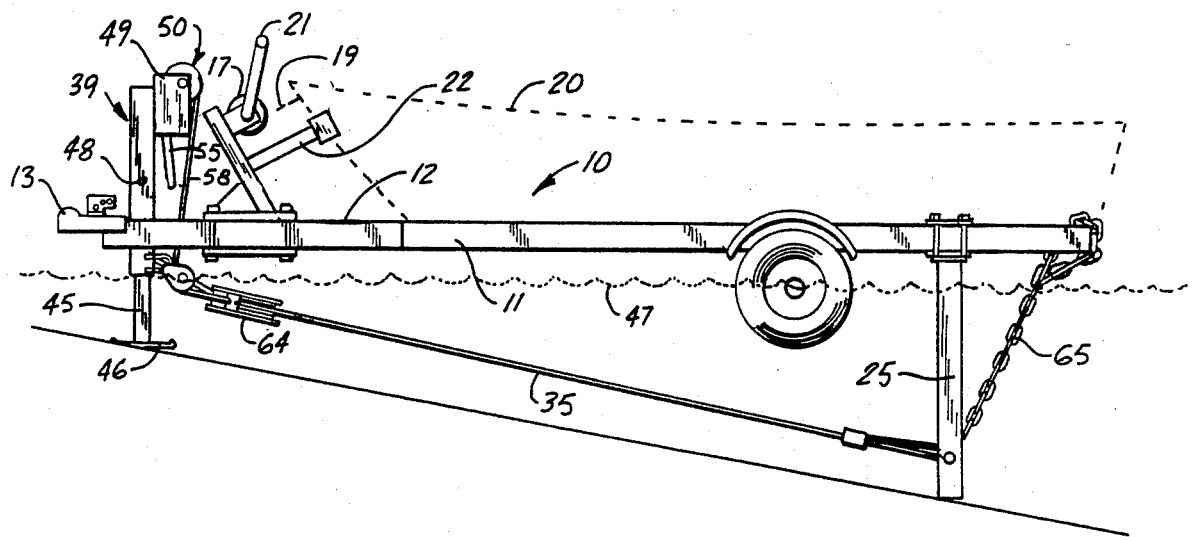
FIG. 2 is a view similar to FIG. 1 but with the extensible legs in a position in which a boat is lifted out of the water.

In order to move the leg 25 (and similarly leg 26) from the position shown in FIG. 1 to that shown in FIG. 2, a plurality of cables 35 and 36 are secured to the tubular member 29. As shown, the end of each cable 35 and 36 is wrapped around the tube 29 several times and is fastened to the main portion of the cable by any suitable cable clamp 37. It is obvious that upon retracting the cables 35 and 36, the legs 25 and 26 will be rotated in a clockwise direction from the position shown in FIG. 1 to that shown in FIG. 2. The means for retracting the cables 35 and 36 will now be described.

Secured to the forward end of the tongue 12 is a combined winch and supporting post assembly 39. This comprises a tube 40 of square cross section shown in section in FIGS. 4 and 5. The tube has securd thereto, as by welding, two plates 41 and 42 which are disposed on opposite sides of the tongue member 12 and are clamped to the tongue member by bolts 43.

A tubular post 45 is slidably mounted within the tube 40. At the bottom end of the tube 45, a foot plate 46 is secured to the tube to engage the ground or other supporting surface. The tube 45 is provided with a plurality of holes (not shown) and a suitable pin 48 is adapted to extend through the wall of the tubular member 40 and through the selected hole in the tubular post 45. By raising or lowering the tongue, the post 45 can be adjusted to the desired height by selecting the hole through which the pin 48 is passed.

Figure 4:
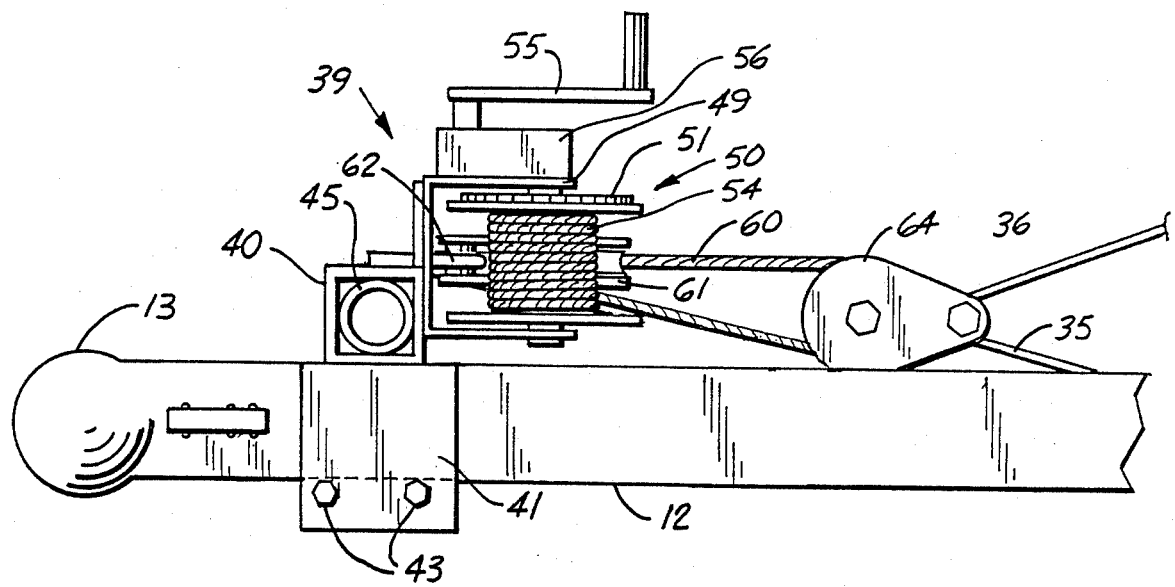
FIG. 4 is a top plan view of a portion of the cable actuating mechanism.
Figure 5:
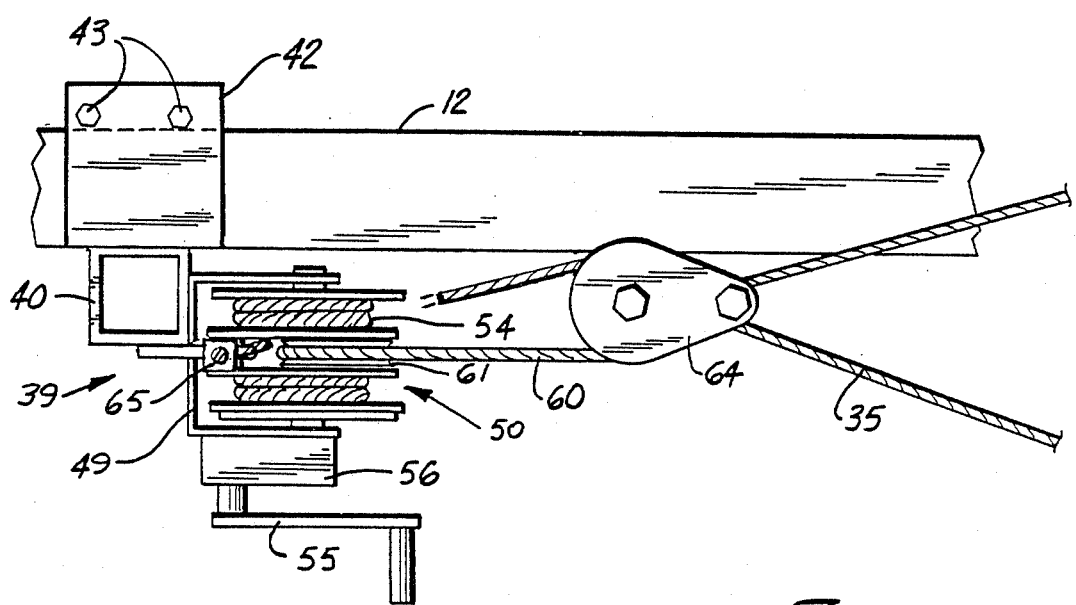
FIG. 5 is a bottom plan view of the mechanism shown in FIG. 4.

Secured at the upper end of the tube 40, as by welding, is a U-shaped bracket 49, best shown in FIGS. 4 and 5. A winch assembly 50 is journaled in the opposite arms of the U-shaped member 49. This comprises a drum 54. A cylindrical set of ratchet teeth 51 are disposed on the outer side of this drum, the teeth being adapted to cooperate with a pawl to prevent the drum from being unwound when wound up to retract the cables 35 and 36. A cable 60 is secured at one end to the drum 54 and is wound around the drum. The cable then passes over a pulley 61 pivotally secured to an ear member 62 welded to the tube 40. The cable, after passing over the pulley 61, passes over the pulley of a pulley assembly 64 and back to the post 40 where it is clamped by a suitable cable clamp 65. It will be obvious that as the drum 54 is wound up, the cable 60 will act to move the pulley assembly 64 to the left as viewed in FIGS. 4 and 5. The two cables 35 and 36 are secured to the pulley assembly 64. The cables may be a single cable if desired. In other words, a single cable may extend from the tubular post 29 around the pin in the pulley assembly 64 and back to the post 29.

It will be obvious that as the drum 54 is rotated to exert tension on the cable 60 and the resultant movement of pulley assembly 64 to the left (as viewed in FIGS. 4 and 5), cables 35 and 36 will be drawn to the left to tip the legs 25 and 26 about the rod 28. This will cause the legs 25 and 26 to be moved from the position shown in FIG. 1 to the position shown in FIG. 2. Because of the pawl in the winch mechanism 50, the legs will be firmly held against rearward movement.

It is desirable that a chain 66 or another suitable tension member be connected between the outer extremity of legs 25 and 26 and the frame of the trailer 10 so as to limit the movement of the legs 25 and 26 in a clockwise direction (as viewed in FIGS. 1 and 2). In this way, it will be assured that the legs 25 and 26 will be held in a substantially vertical position, preferably slightly before a straight vertical position.

As is evident from FIG. 2, when the legs 25 and 26 are rotated to the position shown in FIG. 2, the entire frame of the trailer 10 is raised sufficiently to move the boat 20 out of the water. The water line is indicated by reference character 47. Because of the front post 45 and the two legs 25 and 26, the frame of the trailer is held in a very stable position. Because the boat is out of the water, it is relatively unaffected by small waves and can be stored in the position shown in FIG. 2 for long periods of time.

It will be readily seen that the arrangement of the present invention can be attached to a great variety of trailers without altering the trailer in any way. Both the mechanism for supporting the legs 25 and 26 and the front post and winch assembly are readily attached to the trailer frame without modification of the trailer in any way. The entire assembly can be packed in a relatively compact box and assembled onto a trailer using very simple tools. While the primary purpose of the boat lift is to enable the boat to be raised out of the water, it can also be used for raising the trailer when on the ground to enable a tire to be changed, for example. It will be readily apparent from FIG. 1 that if the legs 25 and 26 are lowered to a vertical position, the wheels 23 will be off of the ground to enable them to be readily removed.

Regardless of whether the boat life mechanism is being used to store the boat or to raise it sufficiently for repair, the trailer can be readily lowered to its normal position by releasing the latch on the winch mechanism and releasing the cables 35 and 36. A slight forward movement of the trailer will then tip the legs 25 and 26 rearwardly and they can then be raised. Any suitable means can be employed for holding the legs 25 and 26 in their horizontal position. For example, the chain 66 previously referred to can be used for this purpose by disconnecting the chain from the frame and reconnecting it in such a way that the legs 25 and 26 are held in substantially the horizontal position shown in FIGS. 1 and 3.

MODIFICATION OF FIGS. 6 THROUGH 10

Figure 6:
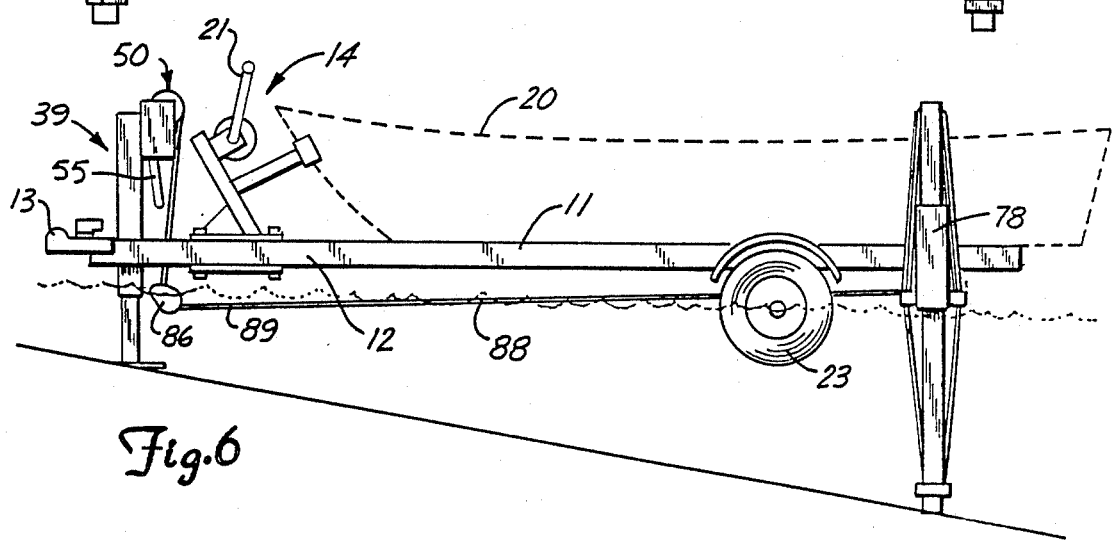
FIG. 6 is an elevational view of a modified form of the invention showing longitudinally extensible legs.
Figure 10:
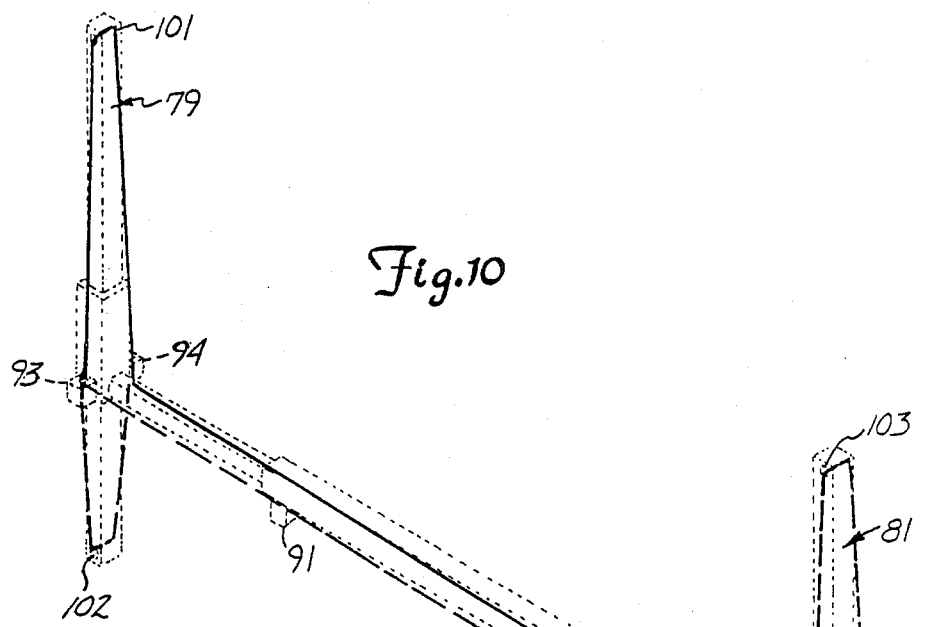
FIG. 10 is a schematic view showing equalizing cables and the manner in which they are connected to the extensible legs.

In FIGS. 6 through 10, I have shown an arrangement which is very similar to that of FIGS. 1 through 5, but in which the legs are extensible by reason of there being two telescoping members which are relatively movable, rather than being rocked as in the modification just described. The trailer itself may well be exactly the same as in the previously described species. In order to simplify the disclosure, the same reference characters have been applied to the elements of the trailer as were used in connection with the previous species. Thus, referring particularly to FIG. 8, there is a trailer 10 having sides 11 and a tongue 12. Trailer hitch 13 is affixed to the tongue. The boat retracting mechanism 14 has a winch actuated by handle 21 to draw a boat 20 onto the trailer. In FIG. 6, the boat is shown with the trailer elevated to move the boat out of the water. It will be noted that it is above the water line 47.

The apparatus for adjustably supporting the front of the trailer is similar to that of FIGS. 1 through 5, and is again designated by the reference numeral 39. Again, there is a winch 50 with a handle 55 for actuating the winch.

Figure 7:
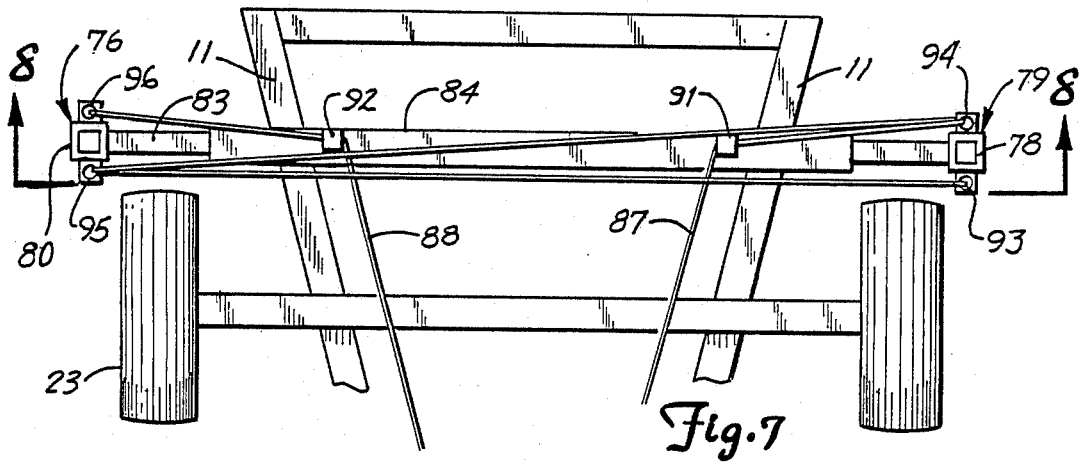
FIG. 7 is a bottom plan view of a portion of the apparatus of FIG. 6.
Figure 8:
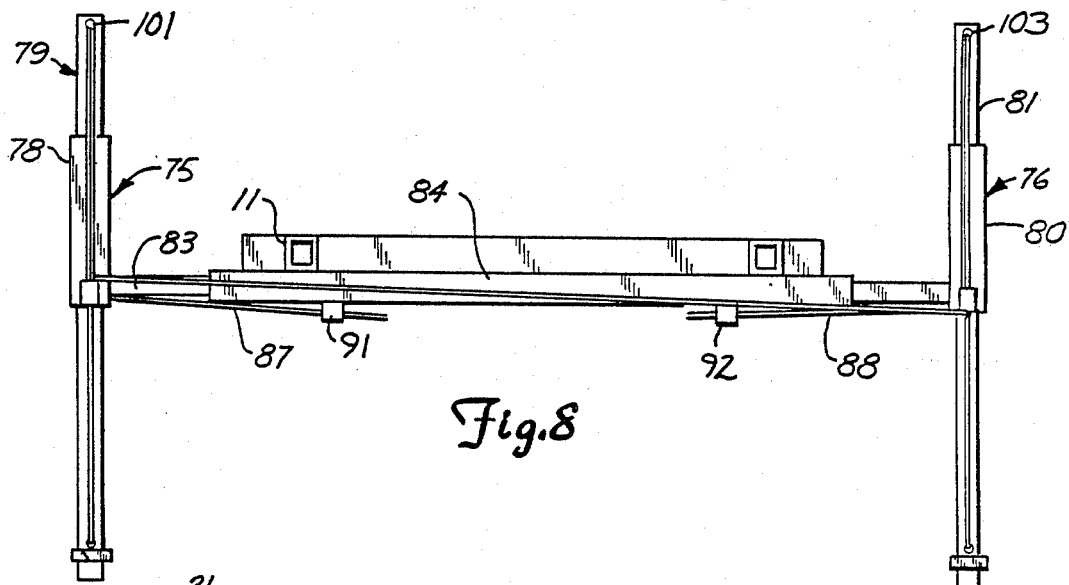
FIG. 8 is a sectional view of the apparatus taken along the line 8—8 of FIG. 7.

Referring to FIGS. 7 and 8, there are two rear legs 75 and 76. These are formed of outer retangular sleeves 78 and 80 in which slide inner legs 79 and 81 which are telescopically secured within the outer sleeves 78 and 80. It will be obvious that upon legs 79 and 81 being forced downwardly, as viewed in FIGS. 6 or 8, the rear of the trailer will be raised.

The apparatus of FIGS. 6 through 8 provides means where, upon turning of the winch 51, the inner legs 79 and 81 will be lowered with respect to the sleeves 78 and 80 to raise the trailer and hence the boat. The outer sleeves 78 and 80 are secured to the opposite ends of a bar 83, preferably of rectangular cross section, which extends from one sleeve 78 to the opposite sleeve 80, the sleeves 78 and 80 being rigidly secured to the bar 83 in any suitable manner. The bar 83 in turn extends through and is rigidly secured to a tubular sleeve member 84 which is fastened to the side rails 11 of the trailer in any suitable manner. For example, it may be fastened to the side rails 11 in the same manner as the tubular member 30 is secured to the side rails 11 in FIG. 3. The important matter is that this tubular member can be readily fastened to the side rails by the use of relatively simple tools.

Extending from the winch 50 is a cable 85 which passes over a pulley 86. Secured to the cable 85 at point 89 are two cables 87 and 88. The cable 87 is used to actuate the leg 79 and the cable 88 is used to actuate the leg 81. Both of these cables are moved simultaneously by operation of the winch 50.

The underside of the outer tubular member 84 is provided with two cable guides 91 and 92. The cable guide 91 has an aperture through which cable 87 passes and the cable guide 92 has an aperture through which cable 88 extends. These capable guides could take the form of pulleys, for example, to enable the cables 87 and 88 to pass more freely therethrough.

The sleeve 78 is provided with two further cable guides 93 and 94, and the sleeve 76 with cable guides 95 and 96. The leg 79 is provided with an aperture 101 at its upper end and an aperture 102 at its lower end. Similarly, the leg 81 is provided with an aperture 103 at its upper end and an aperture 104 at its lower end.

Figure 9:
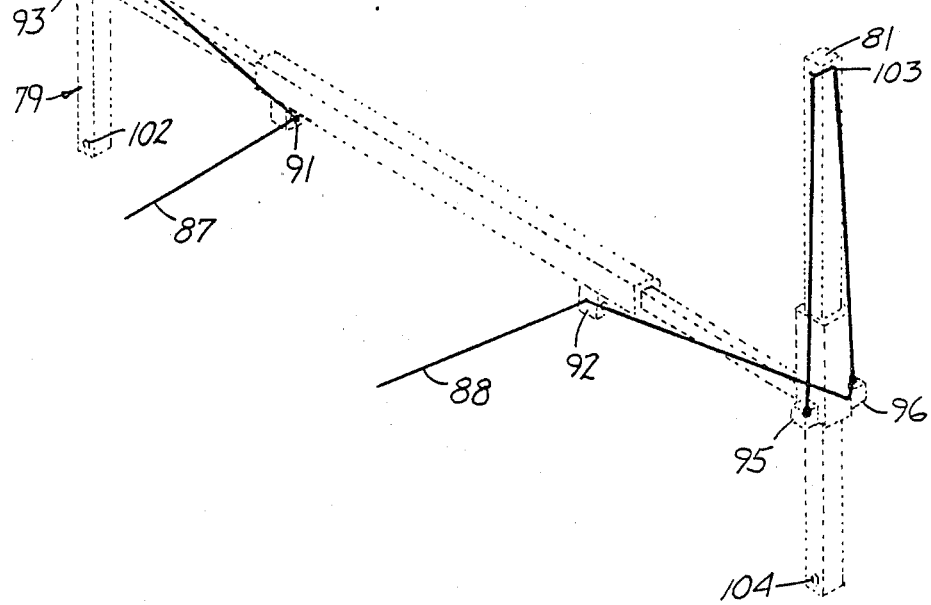
FIG. 9 is a schematic view showing the manner in which cables are attached to extend the legs.

Referring to the schematic diagram of FIG. 9, the cable 87 passes through the cable guides 91 and 94 and up through the aperture 101. The end of the cable is fixedly secured to the cable guide 93. Cable 88 passes through cable guide 92, cable guide 96, through the aperture 103 in leg 81 and is anchored to cable guide 95.

It will be obvious that if cables 87 and 88 are pulled, the legs 79 and 81 will be forced downwardly. This will result in the trailer being raised to raise the boat.

It is desirable that the legs be maintained at the same level to avoid tipping of the trailer. I have accordingly provided further cables which act as equalizing means. In this connection, reference is made to FIG. 10 where there are two cables 98 and 99 used in the equalizing arrangement. For convenience in distinguishing between these cables in the schematic diagram of FIG. 10, the cable 98 is shown in dashed lines while the cable 99 is shown in solid lines. It will be noted that the cable 99 is secured at one end to the cable guide 96. It then passes through the aperture 104 at the lower end of leg 81 and upwardly through the cable guide 95. It then passes through the cable guide 94 upwardly and through the opening 101 of leg 79 and is ultimately secured to the cable guide 93. Cable 98 also has one end secured to the cable guide 96. It passes upwardly and through the opening 103 in the leg 81 and downwardly to the cable guide 95. From there, it passes through the cable guide 93 downwardly, through the opening 102 and back to cable guide 94 to which it is anchored.

It will be readily observed that if leg 79 moves downwardly, force would be exerted upon cable 102 which in turn will be transmitted through cable guides 93 and 95 to the upper end of leg 81. This will force the leg 81 downwardly by a corresponding amount. Similarly, if leg 81 moves downwardly, the cable 99 is forced downwardly to in turn move leg 79 downwardly. In this way, the two legs are kept at the same height to maintain the trailer level.

CONCLUSION

It will be seen that I have provided a simple attachment for a boat trailer which can be used to readily raise the boat above the water line. The attachment can be applied to the trailer by simple tools without modification of the trailer.

While I have described certain specific features of the invention, it is to be understood that the scope of the invention is limited solely by that of the appended claims.

What is claimed is:

1. An attachment for a boat trailer to enable a boat carried thereby to be raised and stored above the water, said attachment comprising:
   a pair of extensible legs;
   a cross bar secured to said legs and maintaining said legs in a spaced apart relation such that the legs are disposed on opposite sides of the trailer;
   means for detachably securing the cross bar to the frame of a boat trailer adjacent the rear end thereof; and
   means for raising the trailer including means for moving the legs with each other from a normal retracted position to an extended position in which the trailer is raised sufficiently with respect to the bottom of the body of water that the boat is supported by the trailer above the surface of the water, said means for raising the trailer including a retracting mechanism with means for securing the mechanism to the front of the boat trailer, and a flexible tension member extending between the retracting mechanism and the legs to extend the legs to a position in which the boat is above the surface of the water, the retracting mechanism having means for maintaining the tension member in the position in which the legs are extended.

2. The attachment of claim 1 in which the cross member is rotatably secured to the trailer so that the legs can be swung from a retracted position in which the boat is in the water to an extended position in which the boat is out of the water.

3. The attachment of claim 1 in which each of the legs has two portions telescopingly secured together and in which the legs are extended by relative movement of the telescoping portions.

4. The attachment of claim 1 in which the retracting mechanism is in the form of a winch comprising a drum on which is wound a cable which extends to the extensible legs, the winch being attached to the front of the trailer.

5. The attachment of claim 4 in which the trailer has a tongue and the winch is attached to the tongue.

6. An attachment for a boat trailer to enable a boat carried thereby to be raised and stored above the water, said attachment comprising:

a pair of extensible legs each of which has two portions extensibly secured together and in which the legs are extended by relative movement of the telescoping portions and in which each extensible leg has an outer tubular member and an inner portion slidable in said outer member;

a cross bar secured to said legs and maintaining said legs in a spaced apart relation such that the legs are disposed on opposite sides of the trailer;

means for detachably securing the cross bar to the frame of a boat trailer adjacent the rear end thereof; and means for raising the trailer including means for moving the legs with each other from a normal retracted position to an extended position in which the trailer is raised sufficiently with respect to the bottom of the body of water that the boat is supported by the trailer above the surface of the water, said means for raising the trailer including a retracting mechanism with means for securing the mechanism to the front of the boat trailer, and a flexible tension member extending between the retracting mechanism and the legs to extend the legs to a position in which the boat is above the surface of the water, the flexible tension member being secured to the inner slidable leg portion and the retracting mechanism having means for maintaining the tension member in the position in which the legs are extended.

7. The attachment of claim 6 in which there are two flexible tension members, each connected through guide means to one of the inner slidable portions, both tension members being connected to the retracting mechanism by a single further tension member.

8. The attachment of claim 3 in which there is means for equalizing the amount the legs are extended.

9. The attachment of claim 1 in which the cross bar has two side plates secured thereto with means for securing said side plates to a side rail of a trailer.

* * * * *